United States Patent [19]
Miles et al.

[11] Patent Number: 6,035,326
[45] Date of Patent: Mar. 7, 2000

[54] MAPPING TABLE LOOKUP OPTIMIZATION SYSTEM

[75] Inventors: Robert S. Miles, Malvern; Jason P. Fox, Bechtelsville, both of Pa.

[73] Assignee: International Business Machines Corporation, Armonk, N.Y.

[21] Appl. No.: 08/925,180

[22] Filed: Sep. 8, 1997

Related U.S. Application Data

[60] Provisional application No. 60/045,852, May 7, 1997.

[51] Int. Cl.[7] ................................................. G06F 15/16
[52] U.S. Cl. ................... 709/206; 709/227; 395/182.02; 395/182.01
[58] Field of Search ............................ 395/200.6, 200.66, 395/200.76, 200.36, 182.02, 182.01, 600, 557, 602, 650; 370/466, 467; 707/100, 101, 104, 2, 3, 10; 709/206, 227

[56] References Cited

U.S. PATENT DOCUMENTS

| | | |
|---|---|---|
| 5,276,868 | 1/1994 | Poole . |
| 5,278,955 | 1/1994 | Forte et al. . |
| 5,283,894 | 2/1994 | Deran . |
| 5,319,779 | 6/1994 | Chang et al. . |
| 5,355,473 | 10/1994 | Au . |
| 5,406,557 | 4/1995 | Baudoin ................................. 370/407 |
| 5,410,691 | 4/1995 | Taylor . |
| 5,459,863 | 10/1995 | Taylor . |
| 5,519,858 | 5/1996 | Walton et al. ............................ 707/10 |
| 5,524,254 | 6/1996 | Morgan et al. .................... 395/200.75 |
| 5,546,390 | 8/1996 | Stone . |
| 5,577,202 | 11/1996 | Padgett ............................... 395/200.36 |
| 5,627,748 | 5/1997 | Baker et al. ............................ 707/531 |
| 5,640,551 | 6/1997 | Chu et al. .................................. 707/5 |
| 5,655,129 | 8/1997 | Ito ............................................. 704/10 |
| 5,748,952 | 5/1998 | Chadha et al. ............................. 707/2 |
| 5,778,371 | 7/1998 | Fujihara ................................. 707/100 |
| 5,787,430 | 7/1998 | Doeringer et al. ..................... 707/100 |
| 5,822,526 | 10/1998 | Waskiewicz ............................ 709/206 |
| 5,852,821 | 12/1998 | Chen et al. ................................. 707/2 |
| 5,909,540 | 6/1999 | Carter et al. ........................ 395/182.02 |

OTHER PUBLICATIONS

Cox, N., "Teaming With Potential: Novell GroupWise 5.0," *Network Computing*, Nov. 15, 1996, p. 118.
Cox, N., "From The Cola Wars To Message Stores," *Network Computing*, Nov. 15, 1996, Buyer's Guide, p. 174.
Doan, A., "SoftSwitch's LMS Gains Messaging Tools," *InfoWorld*, Nov. 4, 1996, p. 19.
Green, T., "Lotus Gives Notes Internet Ability," *PC User*, Jul. 24, 1996, No. 288, p. 43.
Lipschutz, R., "Netscape Servers Fill The Communications Gap," *PC Magazine*, Dec. 3, 1996.
Lisle, R., "Analysis: Internet Integration," *LAN Times*, Jul. 8, 1996, vol. 13, No. 15, p. 66.
Pompili, T., "Lotus Development Corporation: Lotus Notes Release 4.1," *PC Magazine*, vol. 15, No. 17, p. 214.
Randall, N., "What Happens When You Click," *PC Magazine*, Oct. 22, 1996.
Snyder, J., et al., "E–Mail Interoperability Software," *Info World Electric Results*, Mar. 4, 1996, vol. 18, Issue 10.

(List continued on next page.)

*Primary Examiner*—Frank J. Asta
*Assistant Examiner*—Thong Vu

[57] ABSTRACT

The present invention is a system and method for creating lookup trees of mapping specifications for multiprotocol messaging environments. Source data, which is preferably updated infrequently, is compiled into a hierarchical tree, which is stored in a file. The file contains internal data structures that can be used simultaneously by multiple processes at different virtual addresses. A lookup code finds the longest match, if any, for a given key, in a very efficient manner. In a preferred embodiment, the present invention efficiently maps names between X.400 and SMTP per the RFC1327 specification. The organization of the keys, along with the present invention's partial match characteristics, may also be used to efficiently retrieve domain specific configuration data for an SMTP Message Transfer Agent

25 Claims, 7 Drawing Sheets

OTHER PUBLICATIONS

Watt, P., "How 'Suite' It Is: Vendors Bundle Software For Intranets," *Network World,* Oct. 21, 1996, vol. 13, No. 43, pp. 119–120.

"Attachments To Email," *Internet Services,* http://acorn.educ.nott . . . c.uk/SchEd/attach.html.

"Electronic Mail," *Internet Services,* http://austin.onu.edu/ . . . ces.html#ServicesEmail.

"E–Mail Attach File Encoding Methods," *Internet Services,* http://www.sharonagency.com/atthfile.html.

"E–Mail Attachment Resolver," *Internet Services,* http://phonebk.duke.ed . . . /clients/resolver.html.

"E–Mail Concepts," *Internet Services,* http://www.lanl.gov/In . . . LANL/email/email2.html.

"How To Get Unattached To E–Mail Attachments, Part I: A Look At The Macintosh," *Internet Services,* http://www.lanl.gov/In . . . LayneAttachments.html.

"Lotus Messaging Switch At–A–Glance Product Fact Sheet," *Internet Services,* http://www.loispaul.com/online/lpoplolm.htm.

"Lotus Soft–Switch Announces New Messaging Management Tools," *Internet Services,* Apr. 30, 1996, http://www.ibm.com/News/iworld/lotussoft.html.

"Mail Monitor," *Internet Services,* http://www.lotus.com/sswitch/2112.htm.

"MIME," *Internet Services,* http://phonebk.duke.edu:8001/clients/mime.html.

"The Clarity Compatibility Server Solves The E–Mail Attachment Problem," *Internet Services,* http://www.clarity.com/CSoview.html.

Houttuin et al., RFC 1506.

Hardcastle–Kille, RFC 1327.

Aho et al., "Data Structures and Algorithms," pub. Addison–Wesley Publishing Company, 1987, pp. 163–169.

Knuth, "The Art of Computer Programming," vol. 3, Second Edition, Pub. Addison–Wesley, pp. 492–549.

58 — it:ADMD$garr.C$it

62 — astro.it:O$@.PRMD$astro.ADMD$garr.C$it

66 — jrc.it:PRMD$ccrispra.ADMD$garr.C$it

70 — hac.com:O$SCG.PRMD$Hughes.ADMD$MCI.C$us

74 — cdc.com:PRMD$CDC.ADMD$ATTmail.C$us

78 — comtech.rtt.be:PRMD$comtech.ADMD$rtt.C$be

82 — cec.be:PRMD$cec.ADMD$rtt.C$be

MAPPING TABLE LOOKUP OPTIMIZATION SYSTEM

This application claims the benefit of U.S. Provisional Application Ser. No. 60/045,852, filed May 7, 1997.

BACKGROUND OF THE INVENTION

1. Field of the Invention

The present invention relates generally to a hierarchical memory mapping system and more particularly relates to a system that provides hierarchical table lookups for mapping across a multiprotocol messaging environment

2. Description of the Background

With tie explosive increase of traffic on the Internet, specifications standardizing the transfer of electronic messages are frequently being developed. For example, RFC 1327 specifies a standard mechanism for mapping between X.400 and Simple Mail Transfer Protocol (SMTP). Every mail gateway between X.400 and SMTP must follow this specification. One important aspect of this mapping involves the mapping of addresses. To facilitate the mapping of addresses, RFC 1327 specifies three global tables for maintaining equivalences between X.400 domain names and Internet domain names. The three tables are rfc2or, or2rfc and rfc1148gate. The rfc2or table maps Internet domain names into their equivalent X.400 O/R domains. The or2rfc table maps X.400 O/R domains into their equivalent Internet domain names. The rfc1148gate table maps Internet domain names to their preferred gateway name. The three tables are regularly updated by global naming authorities. Every name, whether it be an originator name, a recipient name or any type of copy name, is looked up in at least one of these tables.

The RFC 1327 specification requires that the best matching table entry, if any, be used. The best match is considered to be the longest matching domain name, according to that domain's hierarchy. Typically, this means that each name is looked up with its full domain name as the key. If that lookup fails, the domain is shortened by one element, a subdomain, and looked up again. This repeats until a matching entry is found, or there are no more subdomains. With thousands of entries in each mapping table, this process of a linear search throughout one or more global tables becomes burdensome, time-consuming and expensive. These costs are compounded by the fact that every address on every e-mail item must undergo these lookups. Furthermore, many addresses never match any table entries, thus amounting to wasted work.

SUMMARY OF THE INVENTION

It is therefore an object of the present invention to provide a system that efficiently and quickly maps messaging addresses across multiple protocols.

It is another object of the invention to provide a system that creates table lookups for mapping across a multiprotocol mail environment.

It is another object of the invention to provide a means for applying the RFC 1327 specification in a quick and efficient manner.

According to one embodiment of the present invention, these and other objects of the invention are achieved by providing a system that facilitates the mapping of addresses through constructing mapping tables into domain hierarchy trees, and searching the trees using a Trie search. The Trie search makes use of a key's representation as part of a domain name. Source data, which is preferably changed infrequently, is compiled into a hierarchical tree that is stored in a file. The file contains internal data structures that can be used simultaneously by multiple processes at different virtual addresses. Addresses are stored relative to the base of the map instead of as absolute values. A lookup code finds the longest match, if any, for a given key, in a very efficient manner.

Other objects, advantages and embodiments of the invention are set forth in part in the description which follows, and in part will be apparent from this description or may be learned from practice of the invention.

DETAILED DESCRIPTION OF THE PREFERRED EMBODIMENT

The preferred embodiment of the present invention and its advantages are best understood by referring to FIGS. 1 through 5(c) of the drawings, like numerals being used for like and corresponding parts of the various drawings.

Figure 1:
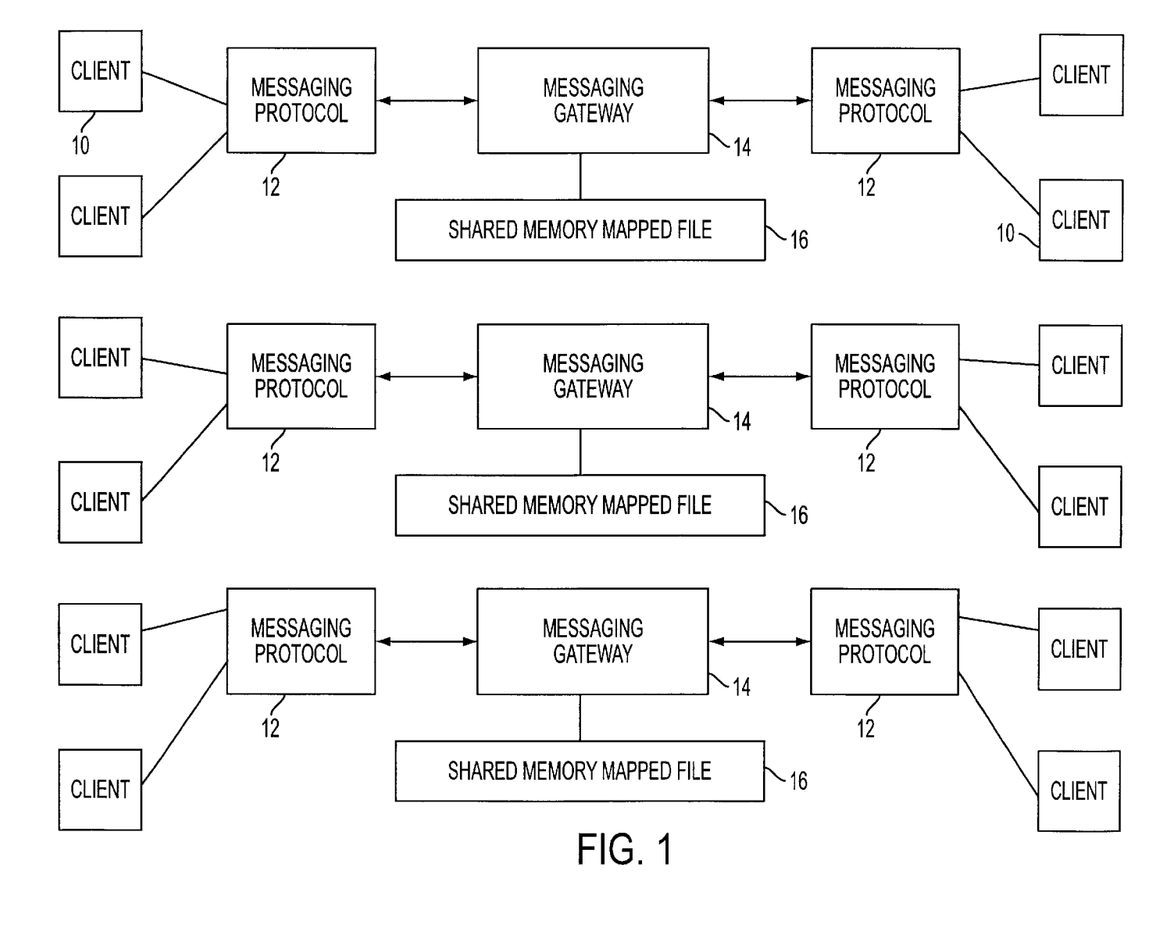
FIG. 1 is a messaging system over a multiprotocol environment.

A messaging system over a multiprotocol environment according to a preferred embodiment of the invention is shown in FIG. 1. Clients, senders, receivers, and other communicators 10 communicate with each other via messaging gateways 14. Messaging protocols 12 define how messages are transferred between communicators 10 in different messaging environments. Messaging protocols include X.400, SMTP and other protocols that are developed to meet the expanding facilities for messaging. Each messaging gateway 14 has at least one shared memory mapped file 16 that enables quick and efficient mapping across different protocols. The memory mapped file 16 is shared among different processes in the same gateway. Typically, a gateway uses a plurality of memory mapped files such as described below.

Figure 2:
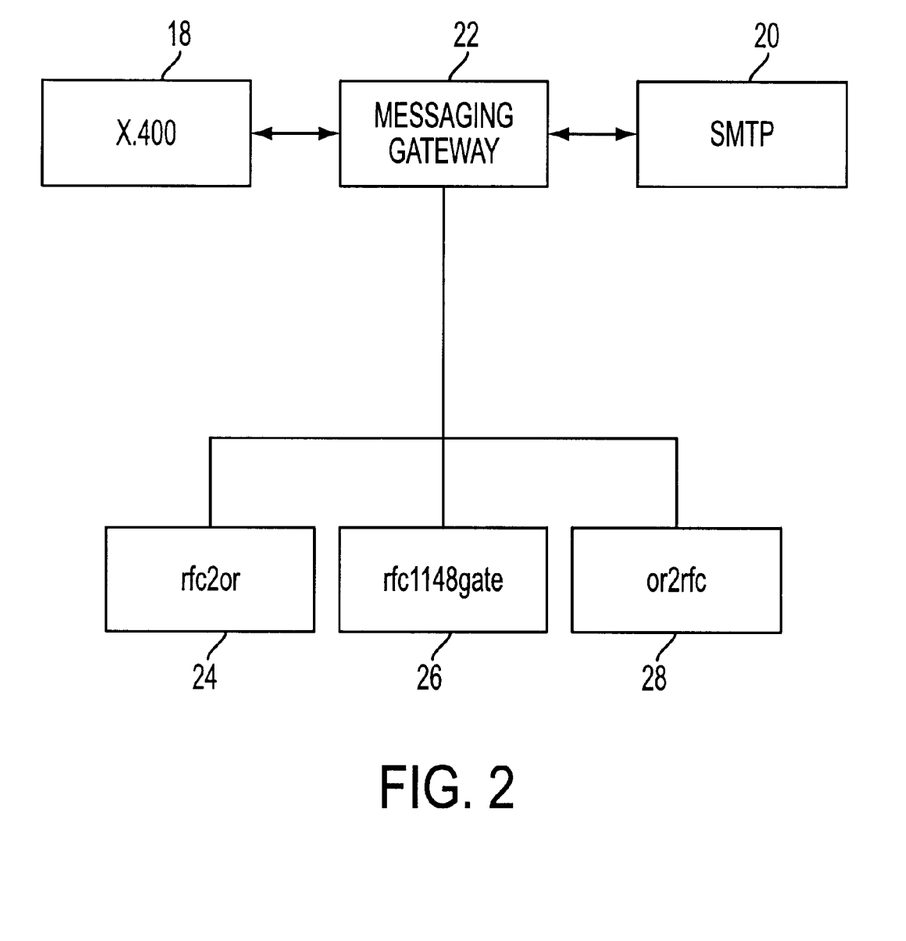
FIG. 2 is a messaging subsystem of the system illustrated in FIG. 1.

FIG. 2, which is a subsystem of the communications network shown in FIG. 1, illustrates communications between X.400 18 and Simple Mail Transfer Protocol (SMTP) 20. The messaging gateway 22 transfers messages between X.400 18 and SMTP 20 through application of an RFC 1327 shared memory mapped file ("RFC 1327 mmap file"). The RFC 1327 mmap file specifies a set of mappings of high level network names between the two protocols 18 and 20. The RFC 1327 mmap file comprises memory mapped files for the three RFC 1327 mapping tables, rfc2or 24, rfc1148gate 26 and or2rfc 28. There is a separate mmap file for each mapping table. A preferred embodiment of the invention provides a domain hierarchy tree for any mapping between messaging protocols. For illustration purposes only, the mapping between X.400 and SMTP will be described in greater detail herein. It is readily understood, however, that the present invention is potentially applicable to any mapping across multiprotocol messaging environments.

Each RFC 1327 mapping table 24, 26 and 28 is created as a domain hierarchy tree, such as an M-ary tree, in its own memory mapped file. This allows the mapping to be created once and then efficiently shared amongst multiple processes.

Nodes in the domain hierarchy tree represent each subdomain in the mapping table. As defined by the Domain Name System (DNS), domains form a tree with each part of the name forming part of the sequence of ultimately resolving the name.

Figure 3:
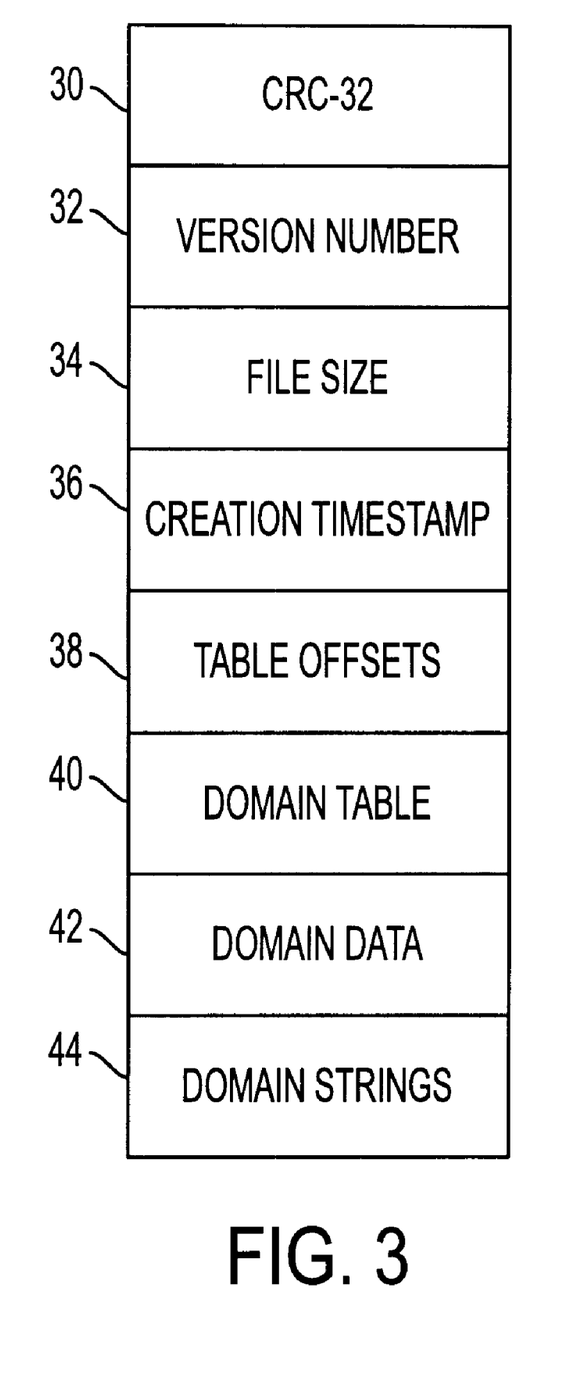
FIG. 3 is a shared memory mapped file created by a preferred embodiment of the invention.
Figure 4:
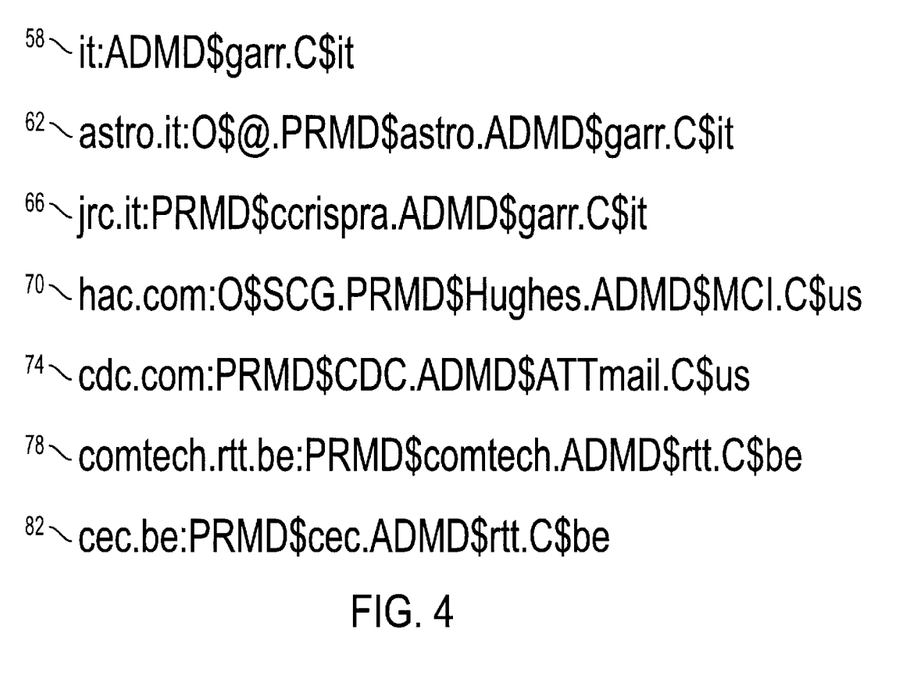
FIG. 4 is an excerpt of an RFC 1327 rfc2or table.

Each shared memory mapped file is preferably organized as illustrated in FIG. 3. CRC-32 30, which is a checksum, helps verify the table data integrity. Other similar means for verifying data integrity may be used. Since the memory mapped files represent internal data structures, a CRC-32 value is computed and stored in each of the memory mapped files for verification during initialization. This helps prevent use of a file that has been accidentally or intentionally corrupted. Preferably this check is made only at startup.

Version number 32 is the table format version number. The memory mapped file contains data structures having an implicit format Creation of a version number allows future implementations to change the format of the data structures without regard to backward compatibility. A version number mismatch will cause the map to be rebuilt File size 34 and creation timestamp 36 are used to enhance uniqueness for the CRC.

Table offsets 38 construct pointers into the memory mapped file. These include offsets to the Domain table, Domain data and Domain strings.

Domain table 40 is the Trie matrix. The Trie preferably is implemented as an M×N matrix, where each column N is a vector length M addressed by subscript k in the range $0 \leq k \leq M-1$. M is a prime number and N represents the number of subdomains within the table. Each component (selected by k) of the vector represents a link to list of subdomain tree roots. The link may be NULL. Each of these roots may be a leaf node of the Trie or may actually be the root node of a new subdomain table (e.g., column).

Domain data 42 are the list nodes to which Trie vector components link. They form linked lists. Since the M-ary decision represented by each column vector in the table is potentially large, a hash function is used to select k and group the subdomain roots into the lists linked by each vector component In a preferred embodiment, the hash function HashPJW() is used. Alternatively, a similar general purpose hash function applicable for text keys may be used.

Domain strings 44 is a heap of string data which holds the key/value data.

If the memory mapped files are older than the source files, or if the memory mapped files are found to be corrupt, then the memory mapped files are compiled from the source tables during master initialization.

Per RFC 1327, the tree is searched to find the longest matching value for each given search key. The search interface returns the best matching value and the portion of the key used to find this value, so that non-matching elements of the key can be mapped according to the algorithms specified in RFC 1327. This reduces an address lookup to one memory based search.

When searching the table for a specific name, the name is broken into its component parts. For example, "spyder.ssw.com" is broken into "com", "ssw" and "spyder". The search starts at the root of the tree, column 0 in the array, and a hash function, hash(com) is used to select k. The list of subdomain tree roots linked by node k is linearly searched for the "com" domain. If "com" is potentially the end of a search, a value for the input key will be stored in the record for "com". Optionally "com" links to a subdomain tree (the one in which "ssw" is found) and the search can continue until a leaf node is found. The search results in an exact match, partial match or no match.

This type of search is efficient. Unsuccessful searches go very fast. Moreover, since the search picks up values for the key along the way, the longest match for the key is always retrieved.

A cache is implemented as an array of cache entries where recently looked up values are placed into the array using HashPJW(). When doing a lookup, a hash is made on the input key and the selected cache entry is compared to the key. If it is a HIT, the value data may be directly extracted from the Domain Data. Otherwise, a table lookup is required. In order to avoid concurrency problems, the cache is maintained on a per process basis in its own local memory.

The linked lists of subdomain tree roots are lexically sorted in ascending order. This allows for reducing the amount of linear searching done on the lists by comparing the search key to the current list comparator. If the comparator is lexically greater than the search key, the linear search may be safely terminated without searching the entire list.

There is a separate mapping (and mapped file) for each table. The calling application decides when to search the tables and which table will be used for a search The invention constructs a plurality of mapping tables into lookup trees. For example, consider the excerpt from the "rfc2or" table illustrated in FIG. 4. The data from this table is mapped into a lookup tree 50 illustrated in FIGS. 5(a)–5(c). Although shown separately, FIGS. 5(a)–5(c) comprise one lookup tree. Each node in the lookup tree 50 represents each subdomain in the rfc2or table. The values "it", "com" and "be" are mapped as roots 52, 54 and 56, respectively, in the lookup table 50. The table entry "it:ADMD$garr.C$it" 58 is mapped into branch 60. Similarly, table entry "astro.it:O$@.PRMD$astro.ADMD$garr.C$it" 62 is mapped into branch 64. Table entry "jrc.it:PRMD$ccrispra.ADMD$garr.C$it" 66 is mapped into branch 68. Table entry "hac.com:O$SCG.PRMD$Hughes.ADMDSMCI.C$us" 70 is mapped into branch 72. Table entry "cdc.com:PRMD$CDC.ADMD$ATTMAIL.C$us" 74 is mapped into branch 76. Table entry "comtech.rrt.be:PRMD-$comtech.ADMD$rttC$be" 78 is mapped into branch 80. Table entry "cec.be:PRMD$cec.ADMD$rtt.C$be" 82 is mapped into branch 84.

Figure 5A:
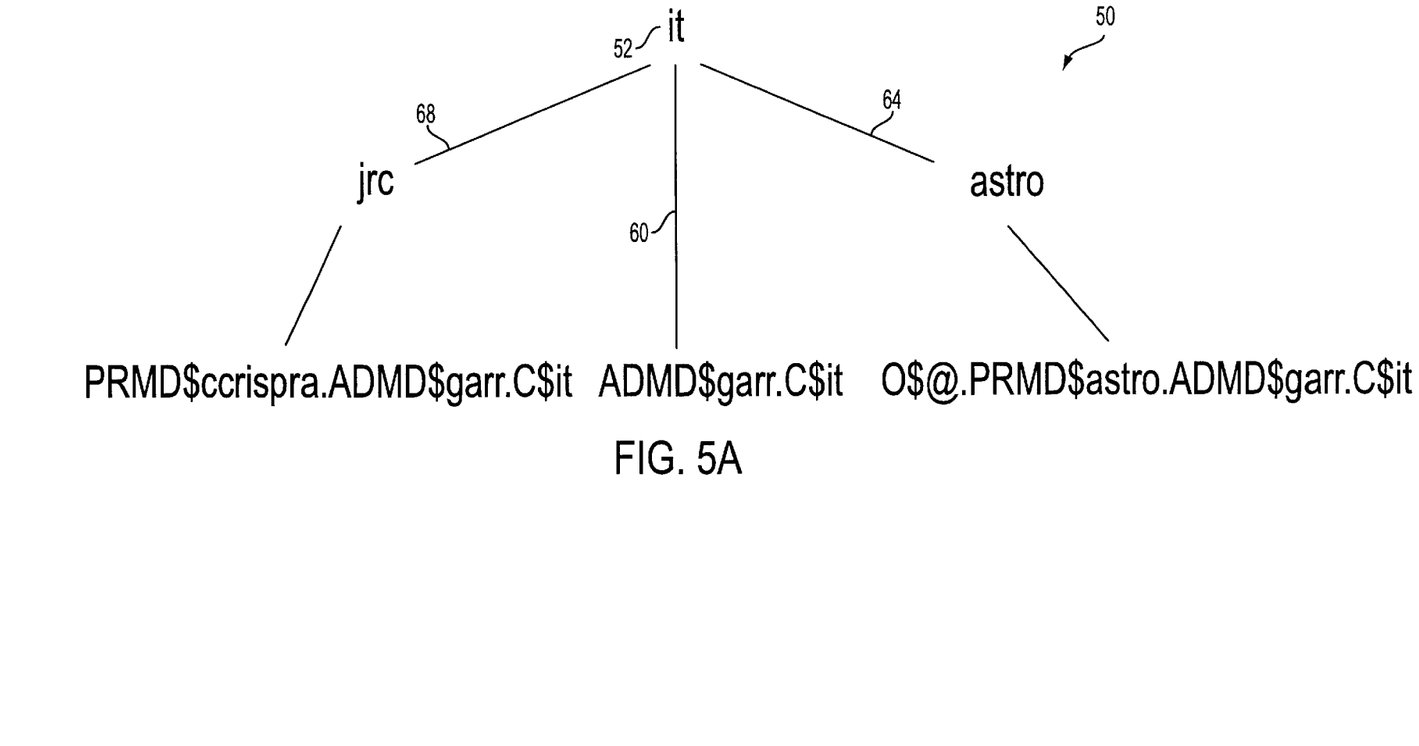
FIGS. 5(a)–5(c) are parts of a lookup tree of the RFC 1327 excerpt of FIG. 4 created according to a preferred embodiment of the invention.
Figure 5B:
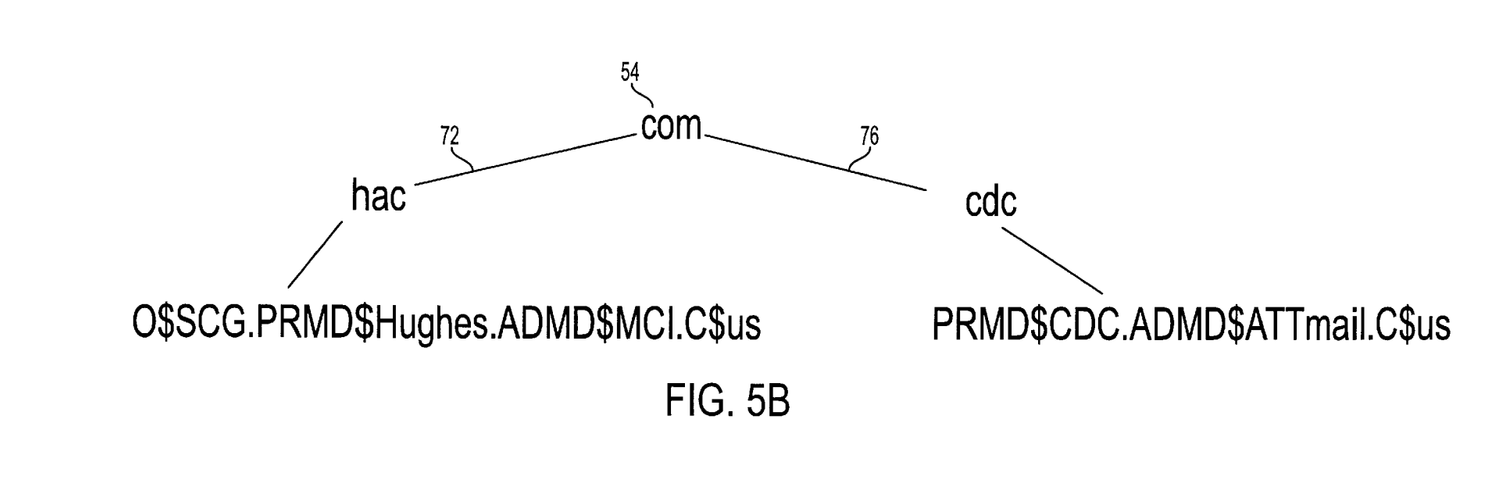
Figure 5C:
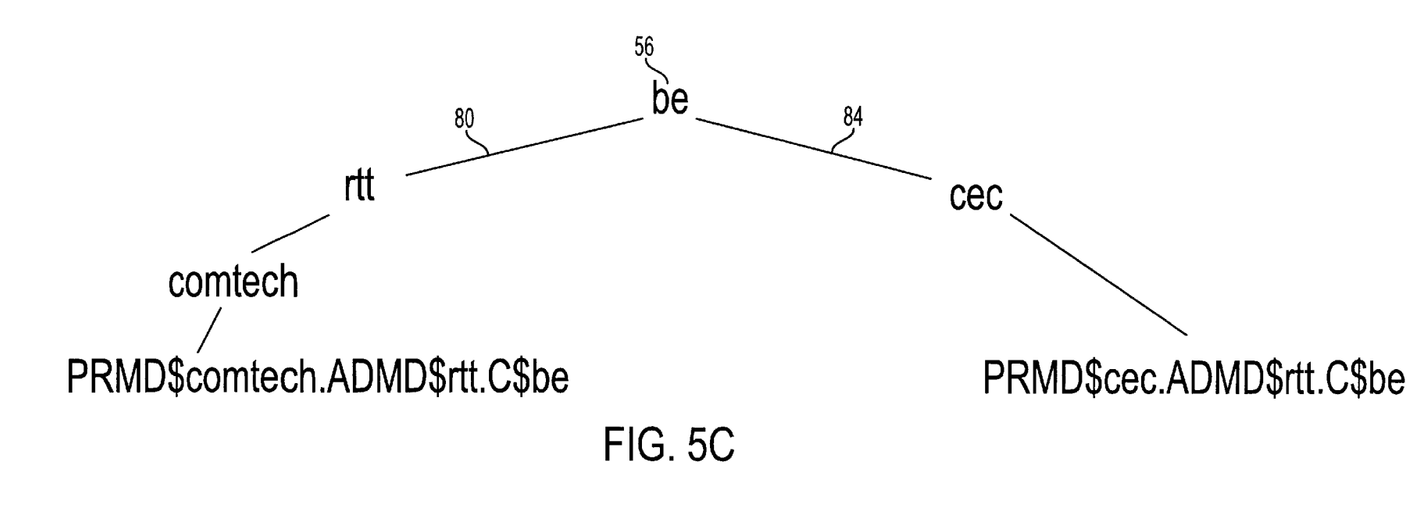

Using the lookup tree 50, the address "spyder.ssw.it" quickly resolves to "ADMD$garr.C$it". The name "spyder.ssw.it" is broken into its component parts "it", "ssw" and "spyder". The search starts at the root of the tree, column 0 in the array, and a hash function, hash(it) is used to select k. The list of subdomain tree roots linked by node k is linearly searched for the "it" domain. If "it" is potentially the end of a search, a value for the input key will be stored in the record for "it". Optionally "it" links to a subdomain tree (the one in which "ssw" is found) and the search can continue until a leaf node is found. In this case, "it" is linked to subdomain trees "jrc" and "astro", but not "ssw". Accordingly, the search for the address corresponding to "spyder.ssw.it" retrieves the address "ADMD$garr.C$it".

Other embodiments and uses of the invention will be apparent to those skilled in the art from consideration of the specification and practice of the invention disclosed herein. The specification should be considered exemplary only.

We claim:

1. A method for mapping addresses in a first messaging format into a second messaging format using table lookup optimization, said method comprising:

constructing a plurality of mapping tables into at least one lookup tree, said at least one lookup tree comprising at least one lookup tree root and at least one subdomain tree linked to said lookup tree root, said subdomain tree comprising at least one subdomain tree root;

searching said at least one lookup tree, said step of searching comprising:

receiving an address in a first messaging format;

dividing said address into a plurality of component parts;

matching at least one of said component parts with one of said at least one lookup tree;

using a hash function to operate upon said at least one lookup tree to select a lookup tree root;

accessing a per process cache to determine if said lookup tree root matches a selected cache entry;

returning a result in a second messaging format if a match is found;

if a match is not found, proceeding to linearly search said at least one subdomain tree root linked by said lookup tree root; and returning a best match subdomain root corresponding to said address in a second messaging format.

2. The method of claim 1, wherein said step of linearly searching comprises:

searching said subdomain tree roots for a longest matching value; and selecting the subdomain tree root having said longest matching value.

3. The method of claim 1, wherein said step of accessing a per process cache comprises accessing an array of recently looked-up values.

4. The method of claim 3, wherein said recently looked-up values are placed into said array using a hash function.

5. A system for mapping table lookup optimization comprising:

a sender, said sender communicating with a first messaging protocol;

at least one receiver, said receiver communicating with a second messaging protocol; and at least one messaging gateway in communication with said sender and said at least one receiver, said messaging gateway comprising a shared memory mapped file; and a per process memory cache;

wherein said shared memory mapped file comprises:

at least one table offset;

a domain table;

a plurality of domain data; and at least one domain string;

wherein said table offset constructs a plurality of pointers into said domain table, into said plurality of domain data, and into said at least one domain string.

6. The system of claim 5, wherein said shared memory mapped file applies the RFC 1327 protocol.

7. A system for mapping table lookup optimization for use in a messaging system having at least one client operating with a first message protocol and at least one other client operating with a second message protocol said system comprising:

a messaging gateway;

a shared memory mapped file, wherein said shared memory mapped file further comprises mapping tables configured as hierarchical trees;

wherein said hierarchical trees comprise:

at least one domain table, at least one domain data list, and at least one domain string;

said hierarchical trees further comprising table offsets, which construct pointers into said shared memory mapped file; and a per process memory cache.

8. The system of claim 7 wherein said hierarchical trees further comprise a checksum module to verify data integrity.

9. The system of claim 7 wherein said hierarchical trees further comprise a version number indicating the revision number of said hierarchical trees.

10. The system of claim 7 wherein said hierarchical trees further comprise at least one uniqueness indicator which assists in uniquely identifying said hierarchical trees.

11. The system of claim 10 wherein said uniqueness indicator is a representation of said hierarchical tree file size.

12. The system of claim 10 wherein said uniqueness indicator is a timestamp indicating a time.

13. The system of claim 7 wherein said at least one domain table comprises a matrix containing links to a list of subdomain tree roots.

14. The system of claim 7 wherein said at least one domain data list comprises listings of subdomain tree roots.

15. The system of claim 7 wherein said at least one domain string comprises key value data.

16. A system for mapping table lookup optimization for use in a messaging system having at least one client operating with a first message protocol and at least one other client operating with a second message protocol said system comprising:

messaging gateway means;

shared memory mapped file means, wherein said shared memory mapped file means further comprise mapping table means configured as hierarchical tree means;

wherein said hierarchical tree means comprises:

domain table means;

domain data list means, and domain string means;

said hierarchical tree means further comprising table offset means, which construct pointer means into said shared memory mapped file means; and a per process memory cache means.

17. The system of claim 16 wherein said hierarchical tree means further comprise a checksum means to verify data integrity.

18. The system of claim 16 wherein said hierarchical tree means further comprise a version number means for indicating the revision number of said hierarchical tree means.

19. The system of claim 16 wherein said hierarchical tree means further comprise at least one means for indicating uniqueness which assists in uniquely identifying said hierarchical tree means.

20. The system of claim 19 wherein said means for indicating uniqueness is a means for representing file size.

21. The system of claim 19 wherein said means for indicating uniqueness is a means for indicating a time.

22. The system of claim 16 wherein said domain table means comprises a matrix containing links to a list of subdomain tree roots.

23. The system of claim 16 wherein said domain data list means comprises listings of subdomain tree roots.

24. The system of claim 16 wherein said domain string means comprises key value data.

25. A computer usable medium having computer readable code embodied therein for enabling a system for mapping table lookup optimization for use in a messaging system having at least one client operating with a first message protocol and at least one other client operating with a second message protocol said system comprising:

a messaging gateway;

computer readable code that identifies a shared memory mapped file, wherein said shared memory mapped file further comprises computer readable code identifying mapping tables configured as computer readable code for hierarchical trees;

wherein said computer readable code for hierarchical trees comprises:

computer readable code for at least one domain table, computer readable code for at least one domain data list, and computer readable code for at least one domain data string;

said computer readable code for hierarchical trees further comprising computer readable code for table offsets, which construct computer readable code for pointers into said computer readable code that identifies a shared memory mapped file; and computer readable code for a per process memory cache.

\* \* \* \* \*